United States Patent

Polk, Jr.

[15] 3,680,614
[45] Aug. 1, 1972

[54] FRUIT PEELING KNIFE ASSEMBLY

[72] Inventor: Ralph Polk, Jr., P.O. Box 3208, Tampa, Fla. 33601

[22] Filed: Feb. 9, 1971

[21] Appl. No.: 113,817

[52] U.S. Cl. ............................... 146/3 M, 146/43 R
[51] Int. Cl. ........................................... A23n 7/00
[58] Field of Search ........................... 146/43 R, 3 M

[56] References Cited

UNITED STATES PATENTS 2,089,502   8/1937   Polk ....................... 146/43 R X
2,182,688   12/1939  Buchhagen ................. 146/43 R

*Primary Examiner*—Willie G. Abercrombie
*Attorney*—Mason, Fenwick & Lawrence

[57] ABSTRACT

A knife peeler assembly for peeling fruit fixed upon a vertical spindle wherein, a rotary knife is mounted in a yoke, a frame, which is pivoted to move along an arcuate path and carry the knife over the surface of the fruit from top to bottom, while the fruit is rotated about its vertical axis. The knife frame carries a motor that drives a knife stub shaft journaled in the frame. An extended knife shaft, carrying the knife is connected to the stub shaft by a universal joint, and the knife is suspended from the frame by a link closely adjacent the knife, with the knife being urged toward peeling position by a light spring. Means are provided to control depth of peeling and to retract the knife at the bottom of its stroke to prevent contact with the fruit spindle.

10 Claims, 4 Drawing Figures

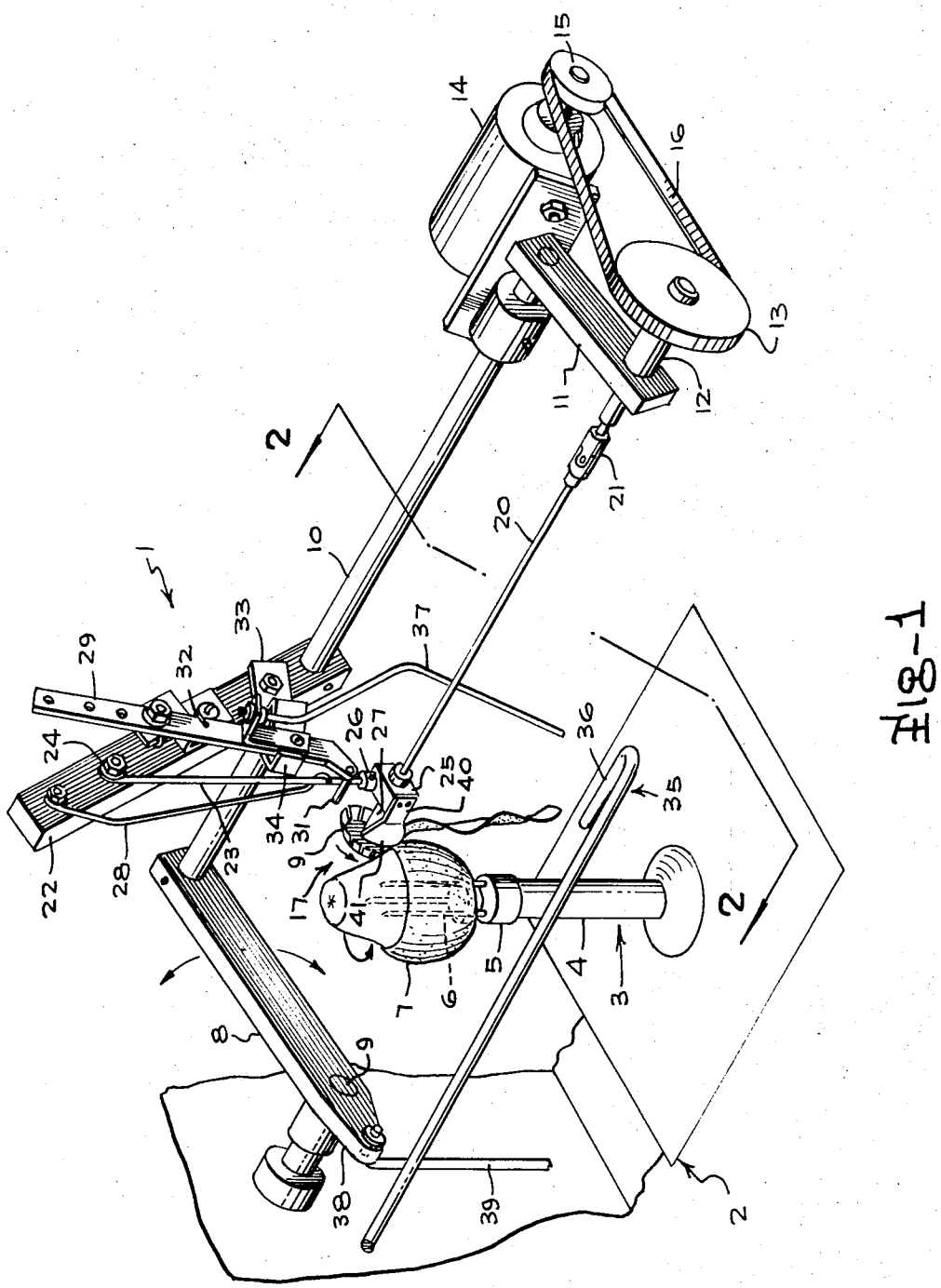

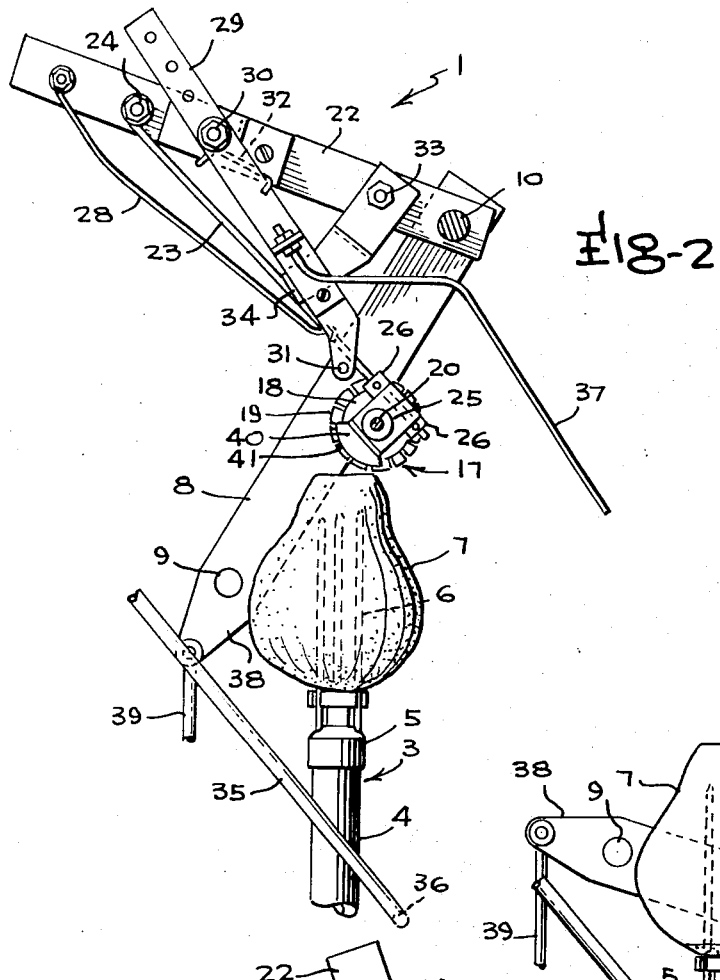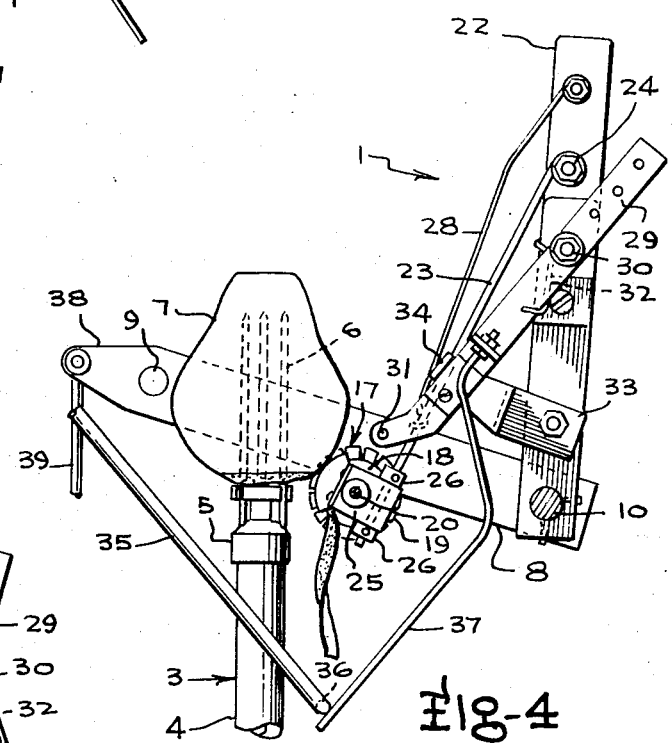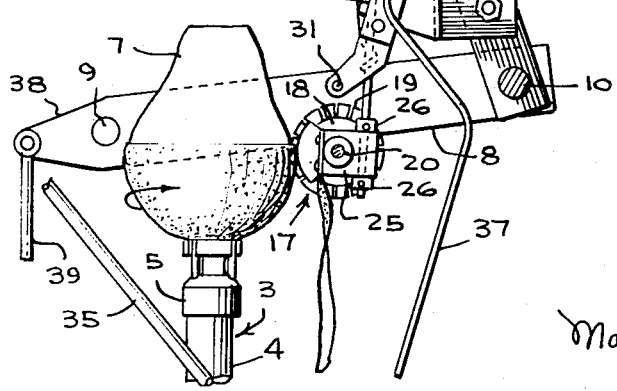

FRUIT PEELING KNIFE ASSEMBLY

STATEMENT OF THE INVENTION

This invention relates to apparatus for peeling fruit, and particularly to peeling apparatus which is automatic in operation and can be used to peel deciduous fruit or peel the membrane from citrus fruit after the albedo has been removed.

BACKGROUND OF THE INVENTION

Mechanized knife peeling of fruit has been practiced for a number of years, but prior efforts have not been wholly satisfactory. This has resulted from the nature of the product being peeled, and from the structure employed to do the peeling.

While each kind of fruit has its own distinctive shape, one pear will differ from another in size, shape and general contour, and one orange will differ from another in the same manner. Because of this, each individual fruit has a surface contour which differs, at least slightly, from other fruit of the same variety. Consequently, any mechanized peeling equipment must either cut the fruit to a predetermined size and shape, or have its cutting element mounted to follow the surface contour of each individual fruit to be peeled. As the first mentioned method is wasteful, the second is generally followed.

In order to follow the contour of the fruit, it is necessary for the peeling knife to have free movement and be guided by the fruit itself. This has been done in many instances by providing a floating mount for the knife, and having a guard adjacent the knife, and movable with it, to ride upon the fruit surface so that the knife will remove a predetermined thickness of peel. In theory, this arrangement is ideal, but in practice, with apparatus previously used, peeling has been far from uniform.

In a number of prior peelers, the peeling knife has been mounted upon a shaft of considerable length, mounted in a long tube which carries a bearing for the shaft. This assembly has considerable weight, which causes the knife to bounce and leave an uneven surface on the peeled fruit. Even if a short shaft is used, the shaft is mounted at the end of a floating arm and the same weight problem is present. When pronounced bouncing occurs, the fruit is alternately gouged and improperly peeled. The more uneven the surface of the fruit, the more the knife will bounce.

SUMMARY OF THE INVENTION

The general object of the present invention is to provide fruit peeling apparatus which will maintain the knife, or peeling tool, in contact with the knife surface so that uniform peeling will be accomplished.

A more specific object is to provide peeling apparatus which will include a frame to provide a general path of travel of the knife about the fruit, with an extremely light weight floating knife assembly carried by the frame.

Another object is to provide a peeler of this nature having means carried by the frame to constantly urge the knife toward the surface of the fruit.

A further object is the provision of fruit peeling apparatus which will operate to peel fruit on a rotating spindle by moving the peeling means in an arc vertically of the spindle, while having the knife free to follow the fruit surface.

It is also an object to provide a peeler of this kind having means to prevent the knife from striking the fruit-carrying spindle at the end of a peeling cycle.

Still another object of the invention is to provide peeling apparatus which is adaptable to peel fruit of different variety and different contour without change in principle or design.

Other objects of the invention will become apparent from the following description of one practical embodiment thereof, when taken in conjunction with the drawings which accompany, and form part of, this specification.

BRIEF DESCRIPTION OF THE DRAWINGS

FIG. 1 is a perspective view of the peeling knife assembly of the present invention;

FIG. 2 is a vertical section through the assembly, taken on the line 2—2 of FIG. 1, and showing the peeling knife at its inoperative position above fruit mounted on a spindle for peeling;

FIG. 3 is a view similar to FIG. 2, but with the knife at the mid point of its peeling cycle; and FIG. 4 is a view similar to FIGS. 2 and 3, but showing the knife at the end of its peeling cycle.

DESCRIPTION OF THE PREFERRED EMBODIMENT

While the fruit peeling assembly of the present invention may be part of a machine for performing other operations upon fruit in addition to knife peeling, the knife assembly is shown and will be described apart from other mechanism, except for a spindle to support fruit while being peeled, in order to simplify the disclosure.

Referring now in detail to the drawings, the knife assembly 1 is shown mounted upon a frame 2 which also supports a spindle 3. For purposes of the present disclosure, it is only necessary to state that the spindle is mounted upon a vertical shaft 4, rotatably supported in the frame and is rotated by suitable means, which is not shown. The spindle consists of a base member 5, fixed to shaft 4, which carries a plurality of vertically extending, parallel, fruit-impalling pins 6. Fruit is placed upon the spindle with its core, or polar axis, vertical and parallel to the impaling pins, and centered with respect to the pins. A pear 7 is shown in position on the spindle in all of the Figures.

The knife assembly is mounted upon a support leg 8, which is pivotally attached to the frame, as at 9. The projected axis of the pivot 9 intersects the rotational axis of the spindle 3, if fruit of generally spherical shape, such as an orange or grapefruit, is to be peeled. If the fruit is elongated, such as a pear, the pivot axis may be spaced from the spindle axis in a direction away from the peeling position of the knife, to provide a flatter traverse arc of travel for the knife. As the assembly is shown for peeling pears, the pivot 9 is offset from the spindle axis. The knife travel path will be described later.

Near the opposite end of support leg 8 from the pivot 9, a rod 10 is fixed to the leg, at a right angle to the leg, and extends across the peeling position. The far end of rod 10 carries a short lever 11. Rod 10 is fixed with respect to support leg 8, and lever 11 is fixed to the rod, so that leg 8, rod 10 and lever 11 move as a unit about the pivot 9. Lever 11 has a short drive shaft 12 journaled near its end, and the shaft carries a pulley 13. A motor 14, having a drive pulley 15, is secured to rod 10, and a belt 16, over pulleys 13 and 15, rotates shaft 12 when motor 14 is operating.

A knife 17, of conventional disk type having a disk 18 and an annular, serrated cutting blade 19, is attached to one end of a drive shaft 20, of small diameter and of light weight material. Shaft 20 has its opposite end connected to stub drive shaft 12 by means of a universal joint 21. This provides a floating mount for the knife.

Rod 10 carries an additional arm 22, adjacent the plane of the knife, which may be termed a knife support and control arm, for it suspends the knife and mounts the means for controlling the position of the knife relative to the surface of the fruit. A knife-suspending link 23 is pivoted at one end to arm 22, as at 24, and its opposite end passes through a bearing block 25 on shaft 20. Collars 26 on link 23 on opposite sides of block 25 fix the link length and determine the swinging arc of knife 17 about pivot 24. A tube 27 on shaft 20 between the knife and bearing block 25 fixes the position of the block relative to the knife. Knife 17 is urged toward spindle 3 by means of a light spring 28, which has one end fastened to arm 22 and the other end bent to lie behind, and in contact with, link 23 near its point of connection to block 25. This causes the knife to be pressed gently, but firmly, against the surface of the fruit being peeled, as will be described.

Knife 17 is retracted by and has its forward movement under the influence of spring 28 limited by a control lever 29, which is also carried by arm 22 by a pivot 30. The free end of lever 29 has a stop pin 31 projecting from its side across the path of forward movement of the knife link 23 to provide a limit of forward movement for the knife, and to act as a knife retracting member under certain circumstances. Lever 29, in turn, is urged toward the spindle by means of a spring 32, attached at one end to the pivot 30 and having its other end in contact with the back edge of lever 29. A bracket 33, mounted on the arm 22, carries a top lip 34 at its outer end that projects across the path of swing of lever 29 to limit the movement of that lever in a forward direction. Thus, knife 17 is free to move rearwardly against the pressure of spring 28, but is urged forwardly toward, or into contact with, stop pin 33 by that spring. Lever 29 is free to move backwardly against the force of spring 32, but it is urged toward its limit stop lip 34 by spring 32. If lever 29 is moved backwardly a sufficient distance to cause pin 33 to contact knife-suspending link 23, continued movement of the lever will draw knife 17 away from the spindle.

Knife 17 will move in an arc about the pivot 9 of support leg 8 when in operation, as will be described, and it is necessary to move the knife low enough to ensure complete peeling, yet it is desirable to prevent any contact of the knife with the spindle. Therefore, a cam 35 is mounted on the frame and has a camming member 36 in the path of movement of a lever operator 37 carried by the lever 29. As the knife-supporting frame swings about the pivot 9 on the downward arc of its cycle, the lower end of operator 37 will strike the camming member 36 and be deflected by it. This will cause link 23 to swing backwardly and draw the knife with it. The shapes of the camming member and the operator are such that the knife will be held away from the spindle regardless of the extent of downward movement of the assembly.

The assembly must have an arcuate movement of sufficient extent to carry the knife from a position above the top of fruit impaled upon the spindle to a position adjacent the fruit bottom to assure complete peeling. This can be accomplished in many ways, but for simplified disclosure, the support leg 8 is shown as having an actuating arm 38 projecting beyond the pivot 9. A link 39 is connected to the arm and has its other end connected to a cam follower, crank, or other conventional means (not shown) to raise and lower the link and rock the knife assembly the required distance.

In use, a fruit, as shown the pear 7, will be impaled upon spindle 3 with its core axis vertical and centered with respect to the spindle. Whether the spindle has a fixed position, as shown, and the fruit loaded in that position, or the spindle has a loading position remote from the peeling position and is moved into peeling position with the fruit in place is immaterial to the present invention. When the fruit is in place at the peeling position, the spindle is rotated. This will rotate the fruit about its core axis. This assembly is in the position shown in FIG. 2 at this time.

When the fruit is in place on the spindle and the spindle is rotating, the knife assembly will be moved about its support pivot 9 to cause the knife blade edge to traverse an arc which will at all points be at least at peeling depth beneath the fruit surface. For best results, the arc should permit deeper penetration than this, and the knife will be moved back from its stop pin 33, so that it is in light pressure contact with the fruit through the bias of spring 28. To ensure knife penetration of the fruit only to a predetermined depth, a guard 40 is mounted on bearing block 25 and has a free end 41 extending toward the knife for riding on the fruit surface. The knife cutting edge projects toward the spindle just the desired distance beyond the guard free end 41 to make a cut of desired depth.

The knife drive motor 14 will be started, and the knife will be rotating as the knife assembly begins its downward arc of movement. When the guard 40 contacts the fruit, the knife suspension link 23 will be moved back slightly from stop pin 31, so that the knife will have floating contact with the fruit while being yieldingly held against the fruit by spring 28. By reason of this arrangement, the guard will slide over the rotating fruit surface, moving in or out as the contour changes, but remaining in light contact with the surface. The peeling position is shown in FIG. 3. If a major change in fruit contour is encountered, the rearward pressure of the suspension link 23 against spring 28 may cause lever 29 to move backward also. If this occurs, both members will return to their former locations under the influence of their respective springs as soon as the condition is relieved. Due to the fact that the support point for the guard and knife is closely adjacent the knife, and the point of spring application is also close to the knife, there will be little tendency for the knife to bounce when it strikes a rough spot on the fruit. The closeness of the suspension point and spring pressure point to the knife, coupled with the light weight mounting shaft, results in an extremely stable knife movement. Consequently, the peeled fruit will be smooth and free from the gouged spots normally caused by knife bounce.

The knife will begin peeling as soon as its rotating cutting edge contacts the rotating fruit. The downward swing of the knife assembly will gradually cause the knife to traverse the fruit surface, following a spiral path from the top to a level adjacent the bottom. As the knife approaches the bottom of the fruit, operator 37 will strike cam member 36 and cause lever 29 to retract and bring stop pin 31 into contact with the knife suspension link 23. Further movement will draw back the knife and prevent contact with the spindle 3. This position is shown in FIG. 4.

After the assembly has reached the bottom of its downward movement, it reverses and moves back to its starting point, carrying the knife over the top of the fruit. The fruit is then replaced, and the cycle is repeated. Normally, a thin slice will be removed from the top of the fruit prior to beginning the knife peeling, and a small segment of the bottom will remain unpeeled after the knife operation, but this segment is cut off after the fruit has been removed from the impaling pins of the spindle.

While in the above one embodiment of the invention has been disclosed, it will be understood that the particular details of construction shown and described are merely by way of illustration, and the invention may take other forms within the scope of the appended claims.

I claim:

1. Knife assembly for peeling fruit mounted upon a rotatable spindle comprising, a frame, a knife mounted for rotation about an axis normal to the rotary axis of the spindle, a shaft upon which the knife is mounted, the shaft being carried by the frame and having a flexible joint between the frame and knife, a suspension link pivoted to the frame and connected to the shaft adjacent the knife to support the knife for arcuate movement relative to the frame in a plane radial to the spindle rotary axis, resilient means carried by frame and contacting the suspension link to yieldingly urge the knife toward fruit on the spindle, means to drive the shaft, and means pivotally mounting the frame for movement about an axis normal to the rotary axis of the spindle to move the knife in an arc longitudinally of the spindle to traverse fruit mounted upon the spindle.

2. Knife assembly as claimed in claim 1 wherein, there is a guard mounted on the shaft adjacent the knife and projecting toward the knife to contact the surface of fruit on the spindle and limit the depth of peeling cut of the knife.

3. Knife assembly as claimed in claim 2 wherein, there is a stop in the path of movement of the knife suspension link to limit the movement of the link and the knife toward the spindle.

4. Knife assembly as claimed in claim 3 wherein, there is a fixed cam, and means carried by the frame to contact the cam and move the stop to draw the suspension link and knife away from the spindle as the knife approaches its downward limit of arcuate travel.

5. Knife assembly as claimed in claim 3 wherein, there is a lever arm pivotally connected to the frame and carrying the stop, means mounted on the frame to limit the movement of the lever arm toward the spindle, and means resiliently urging the lever arm toward its limit means.

6. Knife assembly as claimed in claim 5 wherein, there is a fixed cam, and a cam follower attached to the lever arm to contact the cam and retract the lever arm, suspension link and knife as the knife approaches its downward limit of arcuate travel.

7. Knife assembly for peeling fruit mounted upon a rotatable spindle comprising, a U-shaped frame about the spindle and mounted for pivotal movement about an axis normal to the axis of rotation of the spindle, a shaft mounted in the frame and extending generally parallel to the frame bridge member, a rotary knife on the shaft adjacent the spindle position, a universal joint in the shaft adjacent the mounting of the shaft in the frame, means mounted on the frame to drive the shaft, a suspension link pivotally connected to the frame and connected to the shaft adjacent the knife to limit knife movement to an arc in a plane radial to the spindle axis, and means to resiliently urge the knife toward the spindle.

8. Knife assembly as claimed in claim 7 wherein, there is a stop carried by the frame to limit the movement of the knife toward the spindle.

9. Knife assembly as claimed in claim 8 wherein, there is a bushing on the shaft adjacent the knife and the suspension link is connected to the bushing, and a guard secured to the bushing and projecting toward the knife to contact the surface of fruit on the spindle and limit the depth of peeling cut of the knife.

10. Knife assembly as claimed in claim 9 wherein, there is means to retract the knife against the urging of the resilient means.

* * * * *